US011136965B2

(12) United States Patent
Caruso

(10) Patent No.: US 11,136,965 B2
(45) Date of Patent: Oct. 5, 2021

(54) JOINT FOR THE OSCILLATING CONNECTION OF THE ROTOR TO A SHAFT OF A WIND TURBINE

(71) Applicant: Seawind Ocean Technology IP B.V., Amsterdam (NL)

(72) Inventor: Silvestro Caruso, Genoa (IT)

(*) Notice: Subject to any disclaimer, the term of this patent is extended or adjusted under 35 U.S.C. 154(b) by 188 days.

(21) Appl. No.: 16/483,746

(22) PCT Filed: Feb. 22, 2018

(86) PCT No.: PCT/IB2018/051114
§ 371 (c)(1),
(2) Date: Aug. 6, 2019

(87) PCT Pub. No.: WO2018/154484
PCT Pub. Date: Aug. 30, 2018

(65) Prior Publication Data
US 2020/0025175 A1 Jan. 23, 2020

(30) Foreign Application Priority Data
Feb. 23, 2017 (IT) .................. 102017000020849

(51) Int. Cl.
*F03D 80/70* (2016.01)
*F03D 15/00* (2016.01)
*F03D 1/06* (2006.01)

(52) U.S. Cl.
CPC .......... *F03D 15/00* (2016.05); *F03D 1/0691* (2013.01); *F03D 80/70* (2016.05); *F05B 2260/964* (2013.01)

(58) Field of Classification Search
CPC .......... F03D 80/70; F16C 27/02; F16C 17/06; F16C 17/065; F16F 1/38; F16F 1/393; F16F 1/3935
See application file for complete search history.

(56) References Cited

U.S. PATENT DOCUMENTS 4,028,002 A * 6/1977 Finney .................. B64C 27/35
416/134 A
4,913,411 A * 4/1990 Collins ................. F03D 1/0658
267/141.5

(Continued)

FOREIGN PATENT DOCUMENTS

| EP | 2715121 | 4/2014 |
| SE | 904638 | 11/1980 |
| WO | 02079647 | 10/2002 |

*Primary Examiner* — Justin D Seabe
(74) *Attorney, Agent, or Firm* — Themis Law

(57) ABSTRACT

A joint for the oscillating connection of the rotary shaft of a wind turbine includes a box-shaped hub defining a longitudinal axis and having a pair of holes longitudinally opposite and aligned with each other, a shaft head adapted to be connected to the rotary shaft and having a pair of pivots designed to be inserted in the holes of the hub and having a cylindrical outer surface and a transverse end edge, and a pair of hinges placed at the level of the pair of holes to promote the oscillating connection of the pivots to the hub. Each hinge includes at least one plain bearing mounted on the outer surface of a corresponding pivot, damper elements operatively interacting with the edge of the hub, and a connection system adapted to mutually connect the at least one plain bearing with the damper elements so as to obtain a unitary assembly.

10 Claims, 3 Drawing Sheets

(56) References Cited

U.S. PATENT DOCUMENTS

| | | | |
|---|---|---|---|
| 9,394,937 B2* | 7/2016 | Caruso | F03D 1/0658 |
| 2013/0045040 A1* | 2/2013 | Ginn | F16F 1/393 |
| | | | 403/26 |
| 2015/0226186 A1 | 8/2015 | Mitsch | |

* cited by examiner

JOINT FOR THE OSCILLATING CONNECTION OF THE ROTOR TO A SHAFT OF A WIND TURBINE

The present invention relates to the technical field of mechanical connections for moving members and the subject of the same is a joint for the oscillating connection of the rotor to a shaft of a wind turbine.

As is known, two-blade wind turbines can be provided with a rotor consisting of an oscillating hub which is joined to the end of the shaft.

They can also be provided with an oscillating hub suited to be applied to turbines with pitch control system, wherein the blades are connected to the hub by means of bearings, and to turbines with yaw control system, wherein the blades are rigidly fixed to the hub.

In small-sized turbines the oscillating hubs use hinges consisting of two bearings, each one of which is obtained through the alternate superimposition of cylindrical metal layers and cylindrical layers made of an elastomeric material.

The hinges consisting of cylindrical layers of elastomeric material have relatively small dimensions, since it is not possible to produce large portions of homogeneous elastomeric material.

Furthermore, the maintenance of this type of hinges is particularly complicated, even in the case of small-sized turbines.

On the contrary, it is known that in large-sized turbines an oscillating hub is used which comprises hubs made up by a plurality of distinct elastomeric elements consisting of alternate layers of elastomeric and metallic material.

In this type of hubs the elastomeric elements are subjected to all the loads transferred to the turbine shaft by the blades.

More specifically, these elements are subjected to the stress exerted by the torque and the aerodynamic lift, by the weight force of the rotor and by the moment generated by the oscillation of the rotor around the hinge.

Furthermore, in order to allow the elastomeric elements to operate in a condition of compression, upon assembly they undergo a tangential deformation action which is obtained by making the layers of elastomeric material slide on each other within a seat delimited by one pair of inclined faces.

In this way, the preloading of the elastomeric elements is generated indirectly, while during the operation of the turbine the material is mainly subjected to a cyclic tangential deformation action which is added to that of the preloading.

In this type of hubs, in order to guarantee the duration of the device over time the elastomeric elements are oversized and used in a redundant manner in the hinge.

For very large turbines, this type of hinge may be excessively cumbersome.

Furthermore, the dimensions of the hub comprising a hinge of this type are rather large and this increases the overall costs of the system.

The present invention intends to overcome the limitations of the solutions described above by providing a hybrid version of the oscillating hub, constituted by a combination of mechanical and elastomeric elements.

The present invention intends to resolve the technical problems described above by providing a joint for the oscillating connection between the rotor and the shaft of a wind turbine, wherein said joint features long duration and does not require frequent maintenance.

It is a further object of the present invention to provide a joint for the oscillating connection between the rotor and the shaft of a wind turbine which can ensure the connection of these components even in extreme operating conditions.

It is a further object of the present invention to provide a joint for the oscillating connection between the rotor and the shaft of a wind turbine which is relatively compact and can be used in all types of wind turbines.

It is a further object of the present invention to provide a joint for the oscillating connection between the rotor and the shaft of a wind turbine which can be easily installed and allows the turbine components to be easily inspected.

Again, it is another yet not the least object of the invention to provide a joint for the oscillating connection between the rotor and the shaft of a wind turbine which is simple to manufacture and has relatively low production costs.

These objects are achieved by a joint for the oscillating connection between the rotor and the shaft of a wind turbine made according to claim 1.

The invention is based on a compact solution of the "hybrid" type, in which some loads are transferred from the hub to the shaft of the turbine through plain bearings which are self-lubricating or can be lubricated with grease, while other loads are transferred by the turbine to the hub through elastomeric elements.

In the joint which is the subject of the present invention the cyclic force produced by the weight of the operating rotor and the cyclic moment generated by the oscillations of the rotor around the hinge are counteracted by a series of elastomeric elements which are respectively compressed by the weight force of the rotor and subjected to a tangential deformation action due to the moment generated during the oscillation of the rotor.

The torque and the aerodynamic lift of the rotor and the weight force of the rotor itself generate radial forces which act on the hinge.

These forces are counteracted by two pairs of self-lubricating bearings which generally can be further lubricated using grease or similar lubricants.

Each pair of bearings is constituted by a self-lubricating spherical metal sleeve and by a self-lubricating cylindrical metal sleeve which are radially superimposed to each other.

Other objects of the invention, which are described in greater detail here below, are achieved by a joint for the oscillating connection between the rotor and the shaft of a wind turbine made according to the preceding claims.

The advantages and characteristics of the present invention are clearly illustrated in the following detailed description of a preferred but non-limiting embodiment of a joint for the oscillating connection between the rotor and the shaft of a wind turbine, with specific reference to the following drawings, wherein.

Figure 1:
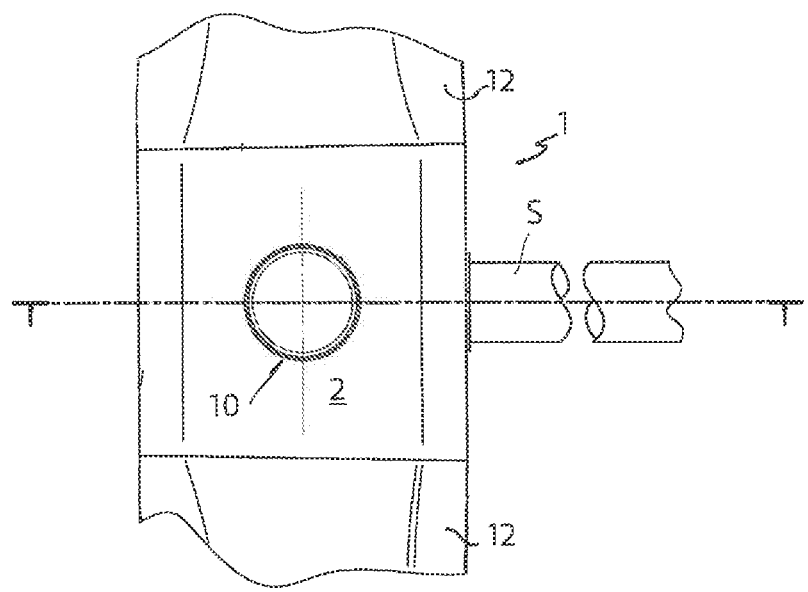
FIG. 1 shows a side view of a joint for the oscillating connection between the rotor and the shaft of a wind turbine.
Figure 2:
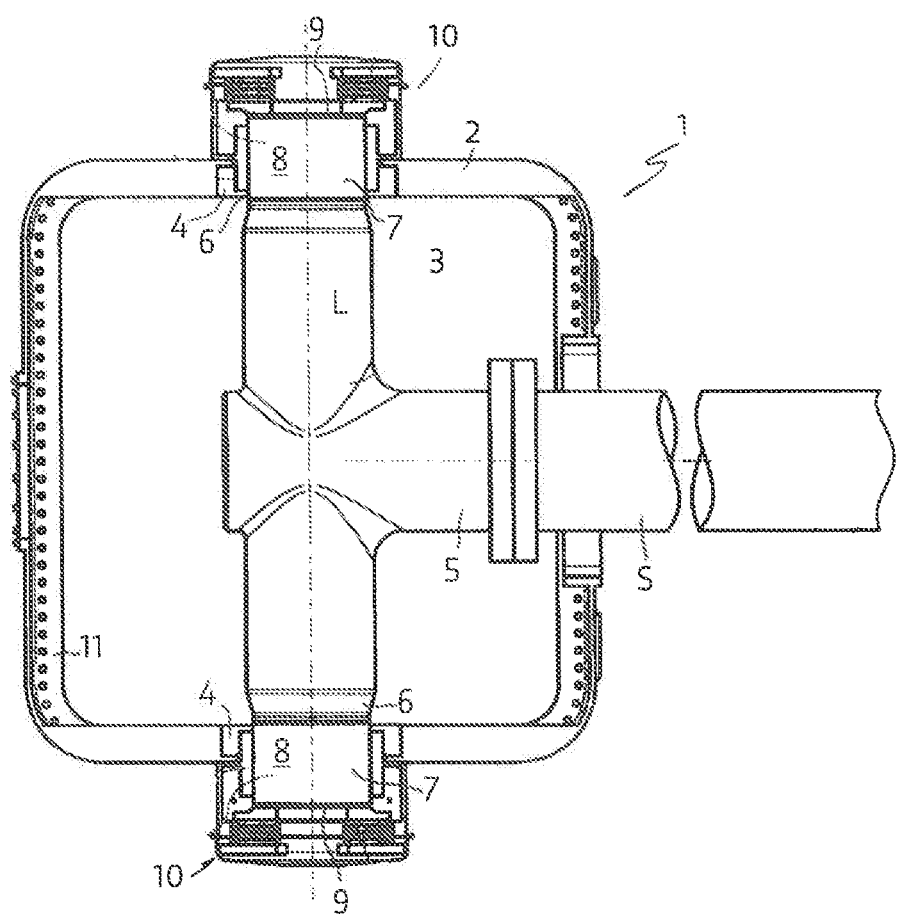
FIG. 2 shows a side sectional view of the joint illustrated in FIG. 1.

The subject of the present invention is a joint for the oscillating connection between the rotor, consisting of the assembly made up by the hub and the blades, and the shaft of a wind turbine, said joint being indicated by the reference numeral 1 in the attached drawings.

The joint 1 comprises a substantially box-shaped rotor hub 2 which defines a longitudinal axis L.

Said hub 2 is designed to house a shaft head 3 suited to be connected to the shaft S of the turbine and is provided with at least one pair of holes 4 which are aligned along the longitudinal direction L but opposite each other.

The shaft head 3 is substantially T-shaped and is provided with a cylindrical end 5 intended to be connected to the shaft S and two opposite ends 6 which define one pair of cylindrical pivots 7 arranged along the longitudinal axis L.

The pivots 7 have a circular outer surface 8 and a substantially transverse end edge 9.

The joint 1 furthermore comprises one pair of hinges 10 placed at the level of the pairs of holes 4 of the hub 2 to promote the oscillating connection of the pivots 7 to the hub 2.

The hub 2 generally comprises a box-shaped metallic structure 11 essentially in a rectangular or cylindrical shape, to which the blades 12 of the rotor are connected.

Each hinge 10 comprises at least one plain bearing 13 mounted on the outer surface 8 of a corresponding pivot 7 in order to allow the controlled rotation of the latter with respect to the longitudinal axis L and its consequent axial displacement with respect to said axis.

Furthermore, each hinge 10 is provided with a plurality of elastic damper elements 14 which interact with the hub 2 and the edge 9 of the pivot 7 to dampen the oscillations acting between the pivot and the hub 2 along and around the longitudinal direction L.

Connection means 15 are also provided, which are integral with the hub 2 and designed to contain the plain bearing 13 and allow the plurality of damper elements 14 to be connected to the pivot 7 in such a way as to form a unitary assembly 16.

Figure 3:
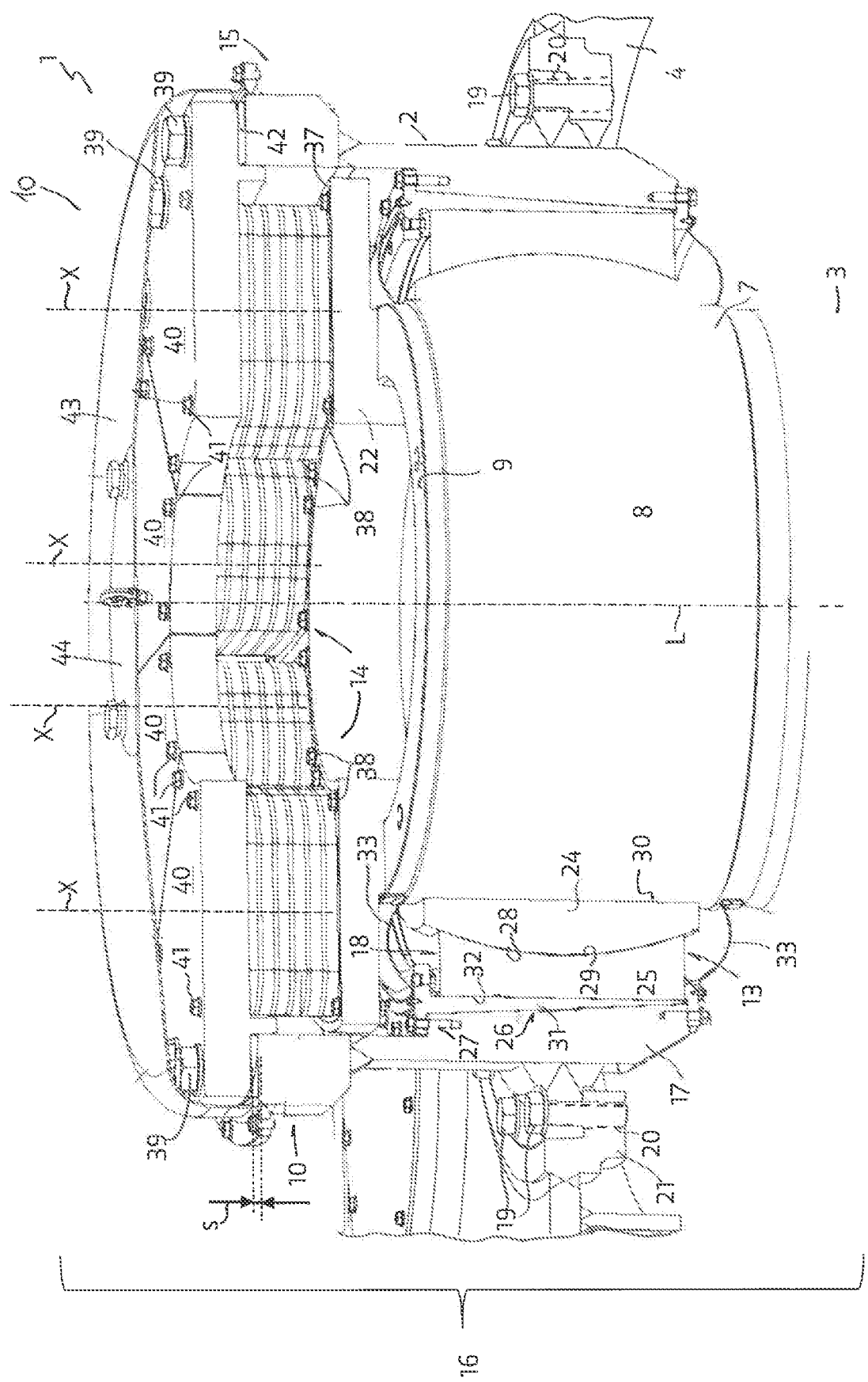
FIG. 3 shows a perspective sectional view of a portion of FIG. 2.

As can be seen in FIG. 3, the connection means 15 comprise a substantially cylindrical longitudinal portion 17 suited to be at least partially inserted in the hole 4 of the hub 2 and connected to the latter. Said longitudinal portion 17 is furthermore designed to define a housing 18 for the plain bearing 13.

The lower portion 17 of the hinge 10 is connected to the hub 2 by means a plurality of first screws 19 passing through convenient holes 20 made in a connection ring 21.

The connection means 15 furthermore comprise a substantially transverse circular ring placed in contact with the end edge of a respective pivot and joined to the cylindrical longitudinal portion.

The circular ring 22 will be joined to the end edge 9 of the pivot 7 by means of suitable connection screws and is suited to allow the plurality of elastic damper elements 14 to be housed therein.

Figure 4:
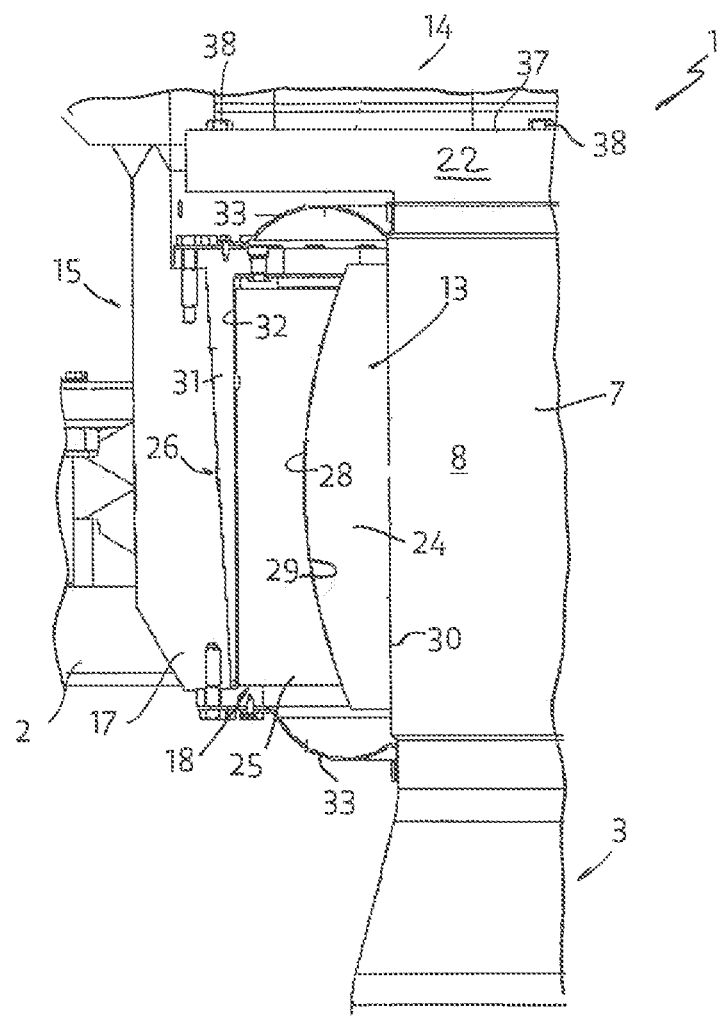
FIG. 4 shows an enlarged side view of a first detail of FIG. 3.

As illustrated in greater detail in FIGS. 3 and 4, the plain bearing 13 comprises a first self-lubricating cylindrical bush 24 slidably fitted on the outer surface 8 of the corresponding pivot 7 of the head 3 of the shaft, and a second self-lubricating bush 25 slidably mounted on the first bush 24 and anchored to the longitudinal portion 9 through a seat 26.

The seat 26 is fixed to the hub by means of the longitudinal portion 17 of the hinge 10 through suitable screws 27 or similar connection elements.

The plain bearing 13 has two spherical sliding inner surfaces 28, 29 respectively obtained on the first bush 24 and on the second bush 25.

The presence of the spherical surfaces 28, 29 allows the misalignment of the pivot 7 with respect to the longitudinal axis L, thus avoiding the presence of any overload and binding in the case of angular displacements between the longitudinal portion 17 and the pivot 7 during the application of operating loads.

The first bush 24 has a substantially cylindrical outer surface 30 which contributes to ensuring its free rotation around the longitudinal axis L and allows axial displacements along said axis between the pivot 7 and the hub 2.

Conveniently, the seat 26 has a conical wall 31 which is placed in contact with the substantially cylindrical outer surface 32 of the second self-lubricating bush 25.

The longitudinal position of said seat 26 can be adjusted in such a way as to lock the second bush 25 in its position with respect to the hub 2.

In this way, it is possible to vary the angular position of the second self-lubricating bush 25 after a predetermined period of operation, in such a way as to reposition it angularly and to vary the portion of its spherical surface 29 designed to come into contact with the inner surface 28 of the first bush 24.

Thanks to this solution, it will be possible to vary the contact areas between the spherical surfaces 28, 29 of the bushes 24, 25 passing from a worn area to a still unworn area and thus extending the operating life of the bearing 13.

Preferably, it is possible to provide lubricating means, not illustrated in the figures, which are designed to promote the controlled distribution of a lubricating fluid between the spherical and cylindrical sliding surfaces 28, 29 of the bushes 24, 25.

For example, said surfaces 28, 29 can be lubricated with grease and suitable grease feeding channels, not visible in the figures, can be obtained in the hinge.

Grease feeding can be periodically restored and the lubricating means can be of the manual or automatic type.

Furthermore, grease can be periodically added both from the inside of the pivot and from the outside of the housing.

The joint may also comprise elastic seals 33 or elastomeric diaphragms positioned at the ends of the bearing 13 and suited to collect the excess lubricating fluid that leaks out of the spherical and cylindrical surfaces 28, 29 of the bearing 13.

Each damper element 14 comprises one pair of metal plates 34 which define its ends.

Inside the plates 34 there are alternately superimposed layers of a metallic material 35, having a plane, concave or different shape, and layers of an elastomeric material 36.

The elastomeric material 36 can be obtained by means of a curing process.

Figure 5:
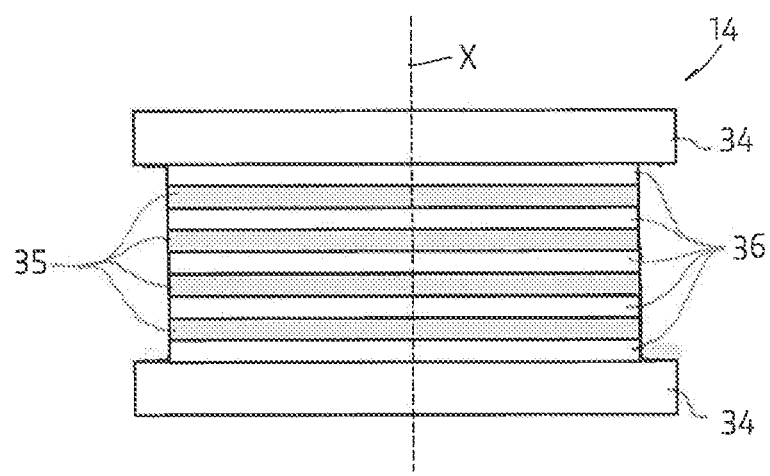
FIG. 5 shows a side view of a second detail of FIG. 3.

Said layers 35, 36 can be mutually superimposed along their own development and superimposition axis X, as can be seen in FIG. 5.

Conveniently, as can be better seen in FIG. 3, the damper elements 14 will be positioned on the circular ring 22 with their development axis X substantially parallel to the longitudinal axis L.

Said elements 14 will be housed along the circumference of the metallic circular ring 22 and a plate 34 of each element can be introduced in a suitable recess formed on the outer surface 37 of the circular ring 22.

Said plate 34 will be joined to the outer surface 37 of the ring 22 by means of second connection screws 38 or other similar elements.

The other end plate 34 of each damper element 14 can be anchored to a sector 40 of the metallic annular ring using third connection screws 39, or equivalent connection elements.

Said sector can in turn be fixed to the longitudinal portion 17 of the hinge 10 by means of fourth connection screws 41.

Conveniently, annular spacers 42 can be inserted between the sectors 40 of the annular ring and the longitudinal portion 17, wherein said annular spacers 42 have a predetermined thickness s suited to promote the axial pre-compression of the elastomeric layers 36 during the tightening of the fourth connection screws 41.

This specific configuration of the sectors 40 of the annular ring makes it possible to assemble, preload and replace the damper elements 14 separately and independently of each other.

The pre-compression of the elastomeric layers 36 can be varied by replacing the annular spacer 42 with a spacer having a different thickness.

The damper elements 14 can be sized in such a way as to give the hinge 10 the axial stiffness and the torsional stiffness required by the functional design of the turbine.

Furthermore, the elastomeric elements 14 are very important for dampening the loads transmitted longitudinally to the pivot 7 of the shaft head 2 by the hub 2.

Furthermore, the damper elements 14 contribute to dampening the loads that are transmitted crosswise to the pivot 7 by the hub 2.

The joint 1 may comprise a cover 43 provided with closing inspection passages 44 through which it is possible to position sensors of various types, not illustrated herein and designed to monitor the stresses acting on the components of the hinge 10.

The components of the hinge 10 can be inspected from the inside of the hub 2 through suitable manholes which are not visible in the figures.

Furthermore, load cells which are not illustrated in the figures, either, can be interposed between the sectors 40 of the circular ring and the corresponding damper elements 14, wherein said load cells are designed to control the axial force of the hinge 10.

Even if this description concerns exclusively the use of the joint in the field of wind turbines, this application should not be considered as limiting the scope of the invention, since the device which is the subject of the invention can be installed also on different mechanical connection members, both on land and underwater, provided that they serve the function of connecting a shaft to a hub in an oscillating manner.

The present invention can be carried out according to other variant embodiments, all of which fall within the scope of the inventive features claimed and described herein; these technical characteristics can be obtained by means of different but technically equivalent components and materials; the invention can be carried out in any shape and size, provided that they are compatible with its intended use.

The reference numerals and signs added in the claims and the description are intended to make the text clearer to understand and must not be considered as elements intended to limit the technical scope of application of the objects or processes they are meant to identify.

The invention claimed is:

1. A joint for an oscillating connection of a rotor shaft of a wind turbine, comprising:
   a box-shaped hub defining a longitudinal axis and having a pair of holes longitudinally counterposed and aligned to each other;
   a shaft head designed to be connected to the rotor shaft and having a pair of cylindrical pivots designed to be inserted through the holes of said hub, each of said pivots having a cylindrical outer surface and a transverse end edge; and
   a pair of hinges located adjacently to said pair of holes to promote the oscillating connection of said pivots to the hub;
   wherein each hinge comprises:
   a plain bearing mounted on the outer surface of a corresponding pivot to allow an axial displacement thereof with respect to the longitudinal axis;
   a plurality of elastic damper members, which operatively interact with the end edge of said pivot to damp an oscillation applied thereon along and around the longitudinal axis;
   connection means designed for reciprocally connecting said plain bearing to said plurality of damper members so as to form an integral assembly;
   wherein each plain bearing comprises a first self-lubricating bush inserted on the outer surface of said pivot and a second self-lubricating bush slidably mounted on said first bush and anchored to a substantially cylindrical longitudinal portion of said connection means by a seat;
   wherein said longitudinal portion is designed to be inserted into a hole of the hub and defines a housing for said at least one plain bearing, said longitudinal portion being joined to said hub by an annular ring having first connection screws;
   wherein said seat is connected to said longitudinal portion of said connection means; and
   wherein said seat has a cone-shaped wall in contact with an outer surface of said second self-lubricating bush, said seat being longitudinally adjustable to selectively block a position of said second bush with respect to said hub.

2. The joint as claimed in claim 1, wherein said connection means comprise a substantially transverse ring joined to said longitudinal portion and in contact with the end edge of a respective pivot, said transverse ring being designed for housing said plurality of elastic damper members.

3. The joint as claimed in claim 1, wherein said first self-lubricating bush and said second self-lubricating bush have respective inner spherical sliding surfaces.

4. The joint as claimed in claim 3, wherein lubrication means are provided to promote a controlled distribution of a lubricant liquid between said spherical sliding surfaces.

5. The joint as claimed in claim 4, further comprising a pair of elastic seals, said elastic seals being located at ends of each bearing to collect the exceeding lubricant liquid that drips from the sliding surfaces of said bearing.

6. The joint as claimed in claim 2, wherein each damper member comprises a pair of end metal plates and metal layers alternated with elastomeric layers are placed therebetween, said metal layers and said elastomeric layers being overlapped along a predetermined elongated axis.

7. The joint as claimed in claim 6, wherein the damper members are arranged along an extension of said transverse ring with their elongated axis substantially parallel to the longitudinal axis.

8. The joint as claimed in claim 7, wherein each of said damper members is housed in a corresponding recess formed on the outer surface of said transverse ring, an end plate of each damper member being anchored to the outer surface of said transverse ring by second connection screws.

9. The joint as claimed in claim 8, wherein the other end plate of each dumper member is anchored to a corresponding ring circular sector by third connection screws, said circular ring sectors being joined to said longitudinal portion of said hinge (10) by fourth connection screws.

10. The joint as claimed in claim 9, further comprising annular spacers that have a predetermined thickness and are interposed between said circular ring and said longitudinal portion to promote an axial preload of the elastomeric layers of said dumper member when the elastomeric layers are preloaded by the fourth connection screws.

* * * * *